United States Patent
Kathail et al.

(10) Patent No.: US 6,704,752 B1
(45) Date of Patent: Mar. 9, 2004

(54) METHOD AND SYSTEM FOR EXECUTING, TRACKING AND RESTORING TEMPORARY ROUTER CONFIGURATION CHANGE USING A CENTRALIZED DATABASE

(75) Inventors: Pradeep K. Kathail, Sunnyvale, CA (US); Shoou Yiu, Los Altos, CA (US); Andrew Valencia, Vashon, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/416,310

(22) Filed: Oct. 12, 1999

(51) Int. Cl.$^7$ ............................................. G06F 12/00
(52) U.S. Cl. ..................... 707/202; 707/10; 707/102
(58) Field of Search ............................ 707/1–10, 100, 707/102

(56) References Cited

U.S. PATENT DOCUMENTS

| | | | | |
|---|---|---|---|---|
| 5,257,368 A | * | 10/1993 | Benson et al. ................... 707/1 |
| 5,287,505 A | * | 2/1994 | Calvert et al. ................. 707/10 |
| 5,452,459 A | | 9/1995 | Drury et al. ................. 395/700 |
| 5,485,455 A | | 1/1996 | Dobbins et al. ................ 370/60 |
| 5,509,123 A | * | 4/1996 | Dobbins et al. ............ 709/243 |
| 5,689,701 A | | 11/1997 | Ault et al. .................. 395/610 |
| 5,909,686 A | | 6/1999 | Muller et al. ............... 707/104 |
| 5,940,771 A | * | 8/1999 | Gollnick et al. ............ 455/517 |
| 5,941,947 A | * | 8/1999 | Brown et al. ............... 709/225 |
| 5,951,649 A | * | 9/1999 | Dobbins et al. ............ 709/238 |
| 5,963,540 A | * | 10/1999 | Bhaskaran .................. 370/218 |
| 5,995,628 A | | 11/1999 | Kitaj et al. .................... 380/49 |
| 6,018,739 A | * | 1/2000 | McCoy et al. .............. 707/102 |
| 6,021,201 A | | 2/2000 | Bakhle et al. ................ 380/25 |
| 6,044,367 A | * | 3/2000 | Wolff ........................... 707/2 |
| 6,052,688 A | * | 4/2000 | Thorsen ...................... 707/102 |
| 6,078,963 A | | 6/2000 | Civanlar et al. ....... 364/DIG. 1 |
| 6,098,076 A | * | 8/2000 | Rekieta et al. .............. 707/202 |
| 6,115,715 A | * | 9/2000 | Traversat et al. ........... 707/100 |
| 6,119,129 A | * | 9/2000 | Traversat et al. ........... 707/202 |
| 6,219,675 B1 | * | 4/2001 | Pal et al. ..................... 707/202 |
| 6,226,644 B1 | * | 5/2001 | Ciscon et al. ................. 707/10 |
| 6,233,582 B1 | * | 5/2001 | Traversat et al. ........... 707/102 |
| 6,301,613 B1 | * | 10/2001 | Ahlstrom et al. ........... 709/223 |
| 6,308,205 B1 | * | 10/2001 | Carcerano et al. .......... 709/221 |
| 6,334,158 B1 | * | 12/2001 | Jennye et al. ............... 709/328 |
| 6,405,251 B1 | * | 6/2002 | Bullard et al. .............. 709/224 |
| 6,446,093 B2 | | 9/2002 | Tabuchi ...................... 707/205 |
| 6,453,356 B1 | * | 9/2002 | Sheard et al. ............... 709/231 |
| 6,462,758 B1 | * | 10/2002 | Price et al. .................. 345/784 |
| 6,477,565 B1 | * | 11/2002 | Daswani et al. ............ 709/217 |

\* cited by examiner

*Primary Examiner*—Kim Vu
*Assistant Examiner*—Anh Ly
(74) *Attorney, Agent, or Firm*—Sierra Patent Group, Ltd.

(57) ABSTRACT

A method and system for transacting routing device configurations using a centralized information provider or database system. The invention receives configuration commands from a user of the router. The invention then communicates the configuration command to the centralized database system. The centralized database system manages a storage structure (database tree) having a plurality of tuple nodes, where each tuple node contains configuration data for the router. The centralized database then carries out the configuration change in the appropriate tuple node using the configuration information provided in the configuration command issued by the user. The invention allows the user of the router to "back-out" of such transactions by reverting the configuration of the affected tuple node to its previous or original state. The invention also reverts the configuration of the affected tuple nodes upon the occurrence of certain events.

10 Claims, 7 Drawing Sheets

METHOD AND SYSTEM FOR EXECUTING, TRACKING AND RESTORING TEMPORARY ROUTER CONFIGURATION CHANGE USING A CENTRALIZED DATABASE

BACKGROUND OF THE INVENTION

1. Field of the Invention

This invention pertains generally to internetwork router operating systems. More particularly, the invention is a method and system for carrying out router configuration transactions and reversions using a centralized database system.

2. The Prior Art

In a routing device, internetwork operating systems (IOS) or more commonly, router operating systems (OS), provide the basic command functions for the routing device as well as various subsystem components which provide specific functions or routines provided by the routing device.

In general, routing devices carry out the operation of reliably transferring network messages or packets between a network of coupled devices, or a collection of such networks. A reliable transfer protocol is provided by the IOS for carrying out such operation. Additionally, an interface in communication with a Configuration (config) subsystem is provided which allows a user of the routing device to configure the operations of the routing device.

The user may configure, for example, the IP address of a serial interface facility or the default route for the routing device. A config command issued by the user is received by the config subsystem and processed therein. The config subsystem determines from the config command issued by the user which client Subsystem is affected by configuration information contained in the config command. The config subsystem then carries out a communication exchange with the affected client subsystem to deliver the change in configuration information.

However, router devices typically include a plurality of client subsystems which manage specific functions, requiring multiple dependencies between the config subsystem and such client subsystems. Furthermore, client subsystems often have multiple dependencies with other client subsystem. For example, the PPP subsystem is dependent upon the IP subsystem for Internet address information and the AAA subsystem for user authentication and credential information. These and other subsystem dependencies as is known in the art prevent modularity in subsystem design and implementation within the IOS of the router.

Another drawback with current subsystem implementation schemes arises when temporary configuration changes to a subsystem are to be carried out. A temporary change is desired when, for example, a user of the routing device wishes to test a particular configuration to analyze the efficiency of such configuration, but would like the opportunity to subsequently revert or "back-out" of the change if desired. During such a configuration sequence, multiple transactions will typically need to be carried out between various subsystems. For example, where a user configures the IP address of a serial facility port, the config subsystem will communicate the new IP address to the IP subsystem. In turn, the IP subsystem will communicate to the PPP subsystem that serial facility port has new IP address information. When the changes are to be aborted or otherwise reverted, a similar chain of communication is necessary to complete the task of reverting prior changes. Such multiple dependencies between the various subsystems of the IOS make common transactions cumbersome and unnecessarily complicated. Furthermore, design and development of the various subsystems of the IOS must take into account these multiple dependencies requiring longer design and development time.

Another situation where a temporary change is desired is when a user connects to the router via a "dial-in" connection port. Dial-in connections are provided by a plurality of subsystem of the IOS. Certain default settings may be configured for most users. However, specialized settings may be configured for certain users, such as network administrators who have particular access privileges, for example. Where a user connects via a dial-in connection, a dialer subsystem communicates with an AAA subsystem to provide name and password information. Responsive to this communication, the AAA subsystem determines the access credentials of the dial-in user from the name and password information and communicates with a PPP subsystem. The access credentials provide, among other things, the configurations for the user at the dial-in connection port. The PPP subsystem then sets the port configurations for the user according to the user's access credentials thereby enabling point-to-point communication for the user.

When the user disconnects, the PPP subsystem, the AAA subsystem and the dialer subsystem need to communicate with each other to restore default settings. This situation presents another illustration where multiple dependencies between the various subsystems of the IOS make common transactions cumbersome and unnecessarily complicated.

Yet another disadvantage with current IOS transaction methods arises when configuration command issued by a remote user of the routing device causes the user to be disconnected. Such configuration commands while not permanent prevent the user from remotely reconnecting to the routing device to correct the configuration. Normally, the user would need to directly interface with the routing device to correct the configuration, or otherwise manually restart or "reboot" the routing device to discard the current configuration and restore the previous configuration. Current transaction methods do not provide a facility or method for sensing such disconnection events and for restoring the previous connection upon the discovery of such disconnection.

Accordingly, there is a need for a method and system for carrying out router configuration transactions wherein the various subsystems of the IOS are modular and independent. More generally it would be advantageous to have a router configuration transaction method which does not rely upon multiple dependent subsystems and which uses a centralized information provider for router configuration information. The present invention satisfies these needs, as well as others, and generally overcomes the deficiencies found in the background art.

An object of the invention is to provide a method and system for transacting routing device configurations which overcomes the prior art.

Another object of the invention is to provide a method and system for transacting routing device configurations using a centralized database system for storing and retrieving configuration data.

Another object of the invention is to provide a method and system for transacting routing device configurations which does not require multiple dependencies between subsystem applications of the router.

Another object of the invention is to provide a method and system for transacting routing device configurations which allows the subsystem applications of the router to be modular and independent of each other.

Another object of the invention is to provide a method and system for transacting routing device configurations which allows the user of the router device to revert changes made during the transaction.

Another object of the invention is to provide a method and system for transacting routing device configurations which allows changes to be reverted upon the occurrence of predefined events.

Another object of the invention is to provide a method and system for transacting routing device configurations which allows the user of the router device to commit changes made during the transaction.

Another object of the invention is to provide a method and system for transacting routing device configurations which allows changes to be committed upon the occurrence of predefined events.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is a method and system for transacting routing device configurations using a centralized information provider or database system. The method of the invention is provided by operating system software which is run or otherwise executed on the routing device (router). The method of present invention is implemented by software which is stored on a computer-readable medium, such as computer memory, for example.

The invention receives configuration commands from a user of the router. The invention then communicates the configuration command to the centralized database system. The centralized database system manages a storage structure, which is preferably a database tree having a plurality of tuple nodes, where each tuple node contains configuration data for the router. The centralized database then carries out the configuration change in the appropriate tuple node using the configuration information provided in the configuration command issued by the user. The invention allows the user of the router to "back-out" of such transactions by reverting the configuration of the affected tuple node to its previous or original state. The invention also reverts the configuration of the affected tuple nodes upon the occurrence of certain events as described in more detail below.

In its most general terms, the method of the invention comprises software routines and algorithms which are generally provided as part of an operating system which is executed in a router device. The operating system software which is also known as internetwork operating system (IOS) comprises a plurality of subsystems, each of which perform functions for the router.

One of the subsystems provided by the IOS is a centralized database system (sysDB). The sysDB executes as a susbsystem component in the router and provides a centralized storage and retrieval facility for configuration information required by other subsystems of the IOS. The configuration information stored on the sysDB may include, for example, Internet protocol (IP) addresses, Ethernet configurations, subnet masks, default routes, protocol configuration, name server information, user and password data, access levels, and other router data as is known in the art. As noted above, prior art router implementations have required the individual subsystems to handle storage and retrieval of configuration information related to the corresponding subsystem (i.e., IP subsystems contained IP configuration data, AAA subsytems contained user authentication information). The present invention employs a centralized sysDB which handles storage and retrieval tasks normally assigned to various subsystems. By centralizing such configuration information in a sysDB, multiple dependencies between the other individual subsystem are avoided or greatly reduced. This arrangement allows the subsystem design and implementation to be modular. Subsystems may be added and removed with greater ease due to the lack of multiple and prevalent dependencies.

The sysDB subsystem preferably employs a hierarchical name space scheme in a tree format (sysDB tree) for data storage and retrieval of configuration and other information for the router. Each branch or leaf on the tree is treated as a node or a "tuple". In an illustrative example, the sysDB tree employs a naming convention analogous to the UNIX® file system where intermediate nodes of the tree are analogous to UNIX® directories and where leaf nodes are treated as files and data which are associated with the files. In the preferred embodiment, each node or tuple in the sysDB tree has a pointer to its parent node, a pointer to its next peer, and a pointer to its first child. With this arrangement, all the children of a tuple can be iterated by using the first child as the head of a link list and traversing through the corresponding peer of each child. While the sysDB described above employs a tree structure for data storage and retrieval, other data storage facilities known in the art may be utilized including, for example, a table, btree or relational table scheme without deviating from present invention disclosed herein.

The sysDB subsystem is operatively coupled to the other subsystems of the IOS for providing transactional services as described herein. An illustrative IOS may include an Internet protocol (IP) subsystem, an Ethernet subsystem, a dialer subsystem, a point-to-point (PPP) subsystem, an authentication (AAA) subsystem, and a config subsystem, each subsystem operatively coupled to the sysDB subsystem, but not coupled to each other. As is known in the art, the IP subsystem manages the Internet addresses for various port facilities on the router; the Ethernet subsystem manages the Ethernet port facilities on the router; the dialer subsystem manages the dial-in communication access; the PPP subsystem manages the point to point protocol functions on the router; the AAA subsystem manages the user authentication process on the router; and the config subsystem provides configuration management for the router.

Methods for configuring a router are well known in the art and typically involve manual configuration and/or automatic configurations. Manual configurations are provided by a user of the router and are typically issued using configuration commands at a computer or other data processing device, which is operatively coupled for communication to the router. Normally, the user accesses the router using a telnet software program, wherein a user is presented with the current configuration as provided by the config subsystem from data stored in the sysDB. The user then issues configuration commands to the router.

Automatic configurations are routines that provide configuration commands which are executed upon certain events. For example, when a user connects to the router via a "dial-in" connection via a modem, the dialer subsystem, the AAA subsystem and the PPP subsystem manage configuration information required to provide access to such dial-in user. In the present invention, configuration changes are communicated to the sysDB, rather than to one or more of the various subsystem which is authoritative for such configuration data as is carried out in prior art implementations.

The invention provides a technique for carrying out router configuration transactions using the centralized database (sysDB) provided by the IOS wherein configuration transactions are tracked and maintained by the sysDB and may be reverted upon the request of the user of the router device or upon the occurrence of certain events. In general, manual configuration requests are received by the config subsystem from commands provided by a user. In response to this configuration request, the config subsystem communicates to the sysDB the proposed changes which were issued by the user. The sysDB receives the proposed changes and creates a transaction therefrom. As an aspect of this transaction, the sysDB determines which node or tuple in the sysDB tree is affected. The sysDB then iterates or navigates to the affected tuple of the sysDB tree. The sysDB determines whether the current tuple is already locked by another transaction. Variously locking methods known in the art may be implemented, however, in the preferred embodiment of the present invention, a lock is indicated in a tuple by the existence of an "old" value. The existence of an "old" value communicates that another transaction has already modified the present value of the tuple. If the tuple is already locked by another transaction (i.e., an "old" value already exists at the tuple), then the proposed changes issues are refused and a notification is sent to the user to indicate the refusal.

If the tuple is not already locked by another transaction, the sysDB stores the new value from the proposed changes into the tuple while preserving the original value as "old" data. As rioted above, the existence of an "old" value locks the current tuple preventing future modifications to the tuple, until the user either reverts the transaction or commits the transaction as described in further detail below. In certain cases, an array may be provided at a particular tuple to provide a plurality of values at the tuple node. An array may be preferred when a particular port facility may take on one or more values.

The sysDB performs a similar transaction for configuration commands or messages which originate from various other subsystems. For example, when a user connects to the router via a "dial-in" or PPP connection, the AAA subsystem defines the access privileges and network configurations of the user in the sysDB. In this example, configurations to the serial port need to be defined where the configurations are particular to the user who dials in. For example, an IP address may be assigned to the user, access privileges may be assigned to the user, and other pertinent data may also be defined. Using the configuration data provided by the AAA subsystem to the sysDB, the PPP subsystem then provides Point-to-Point protocol communication to the user. Because various users may dial in at different times to access the same serial port, configurations to the port are made at the time the user connects. Normally, default configurations are set for most users, and specific configurations may be set for certain users requiring special privileges.

During a PPP connection, the dialing subsystem receives the name and password credentials of the user and communicates these credentials to the AAA subsystem for authentication. Normally, the user credentials are passed from the dialer subsystem to the AAA subsystem directly rather than through the sysDB. However, an alternative arrangement may be provided wherein the user credentials are communicated from the dialer subsystem to the sysDB, and then communicated from the sysDB to the AAA subsystem to provide additional modularity between the dialer subsystem and the AAA subsystem.

The AAA subsystem queries the sysDB to verify the access privileges of the user based on the name and password provided to the dialer subsystem. The sysDB replies with the access privileges requested. The AAA subsystem then configures the router by initiating a transaction request with the sysDB. The transaction steps are similar to those described above for manual configuration using the config subsystem. Namely, the sysDB receives the configuration request and provides an iterating function to navigate to the affected tuple; the sysDB also verifies the lock status of the affected tuple to prevent overlapping transactions; and if the tuple is not currently locked, the sysDB records the new data into the tuple data store while preserving the previous data as "old" data. The transaction request carried out by the AAA subsystem may configure one or more tuples within the sysDB tree because configuration of a dial-in connection may involve configuration of a plurality of router items including, for example, configuration of the designated port for PPP operation, configuration of the IP address for the user, and other pertinent configurations for PPP operation as is known in the art.

The sysDB then commences a verification and/or notification routine with the PPP subsystem to indicate that PPP services have been configured. The verification routine is described in further detail in copending application Ser. No. 09/416,312 entitled METHOD AND SYSTEM FOR VERIFYING CONFIGURATION TRANSACTIONS MANAGED BY A CENTRALIZED DATABASE filed on Oct. 12, 1999 which is incorporated by reference herein. The notification routine is described in further detail in copending application Ser. No. 09/416,308 entitled SUBSYSTEM APPLICATION NOTIFICATION METHOD IN A CENTRALIZED ROUTER DATABASE, filed Oct. 12, 1999 and is incorporated herein by reference. The PPP receives the verification and/or notification and commences protocol services for the user at the designated port as is known in the art. Alternatively, the PPP subsystem may include routines for monitoring or otherwise periodically ascertaining certain values in the sysDB. In this case, the PPP initiates protocol tasks when certain configurations are made by the AAA subsystem in the sysDB.

Transactions executed by the sysDB where changes are made to the configuration information in the sysDB tree may be reverted upon commands issued by user of the router or upon the occurrence of certain events. After the sysDB is reverted, the old data is restored to the original value, and the changes are discarded. As noted above, changes to the configuration information in the sysDB are carried out by a transaction performed by the sysDB. Each transaction within the sysDB is preferably identified by a transaction name or identification (ID). Where a command or message from a subsystem to revert a transaction is issued to the sysDB, the sysDB carries out the operation of iterating to the affected tuple based on the transaction ID and saving the "old" data as the current or default value for the tuple. The previous changes are discarded and the "old" data field value is purged or otherwise deleted. Purging the "old" data field value removes the lock from the tuple allowing transactions to be made to the tuple once again.

Interested subsystems are notified about transaction abort by normal verification/notification process. In this manner, all subsystems view changes as normal changes either done manually or automatically.

Certain events may be used to trigger the reversion of certain transactions. For example, when a dial-in user disconnects from the router, the transaction which defines the user access privileges must be reverted. In this case, the PPP subsystem which monitors the communication of the user, senses the disconnection of the user from the router and communicates a disconnection message to the sysDB. In response to this disconnection message, the sysDB notifies the AAA subsystem of the disconnection. Responsive to this disconnection notification, the AAA subsystem communicates a transaction revert or abort signal to the sysDB to delete the configurations made as part of the PPP connection. In response to the cancellation message, the sysDB restores the configuration to the sysDB tree in the manner as described above.

Certain configuration transactions may be committed rather than discarded. Committing transactional changes discards the "old" value and accepts the new value as the default value. For example, a user of the router after trying out several configuration changes to the router, may determine that the current changes are the desired changes for operation. Here, the user will transmit a commit message which is received by the config subsystem. The config subsystem will communicate a request to commit the current configuration. In response to this request, the sysDB carries out the operation of iterating to the affected tuple, and purging or otherwise deleting the "old" data field value. The current value made during the initial change now becomes the default value for the tuple. As noted above, purging the "old" data field value removes the lock from the tuple allowing transactions to made to the tuple once again.

In some cases, the invention provides that configuration changes may be grouped into a transaction group. The transaction group includes one or more transaction ID's which identify the configuration changes made as part of the group. In turn, a transaction group may be reverted or committed together. The steps for reverting a transaction group comprise reverting each transaction ID within the group wherein the reverting steps are those described above for reverting a single transaction. Similarly, the steps for committing a transaction group comprise committing each transaction ID within the transaction group wherein the committing steps are those described above for committing a single transaction.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
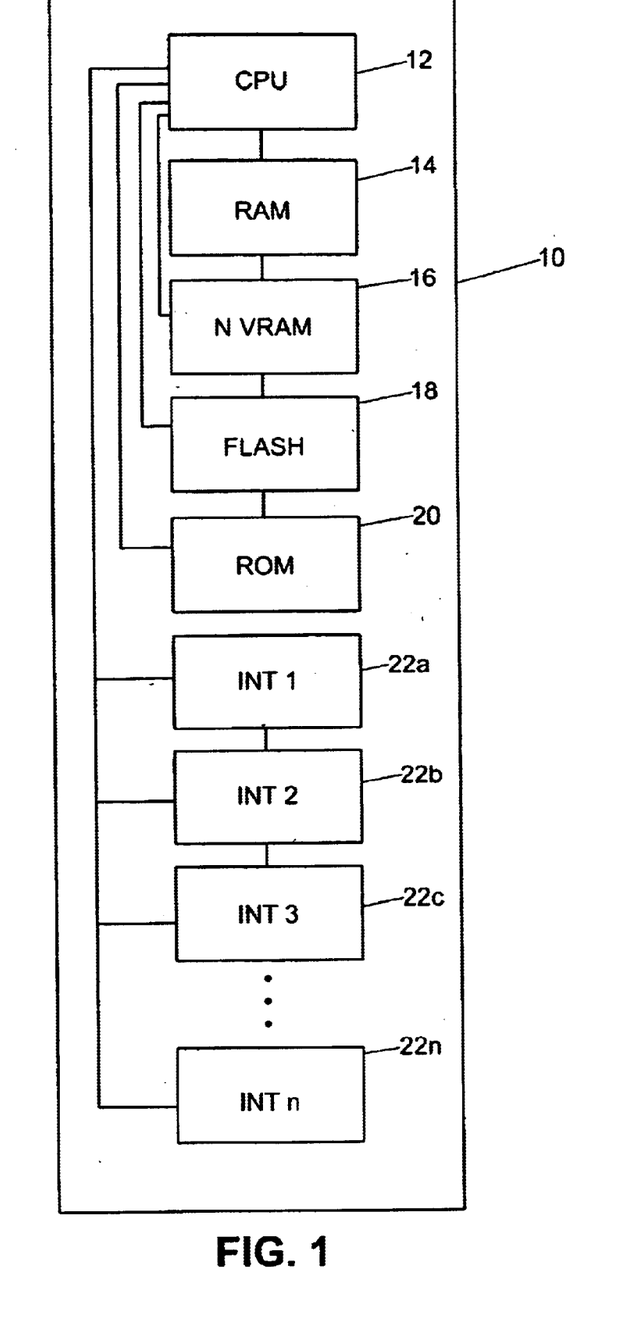
FIG. 1 is a block diagram of a router device suitable for use with the present invention.
Figure 2:
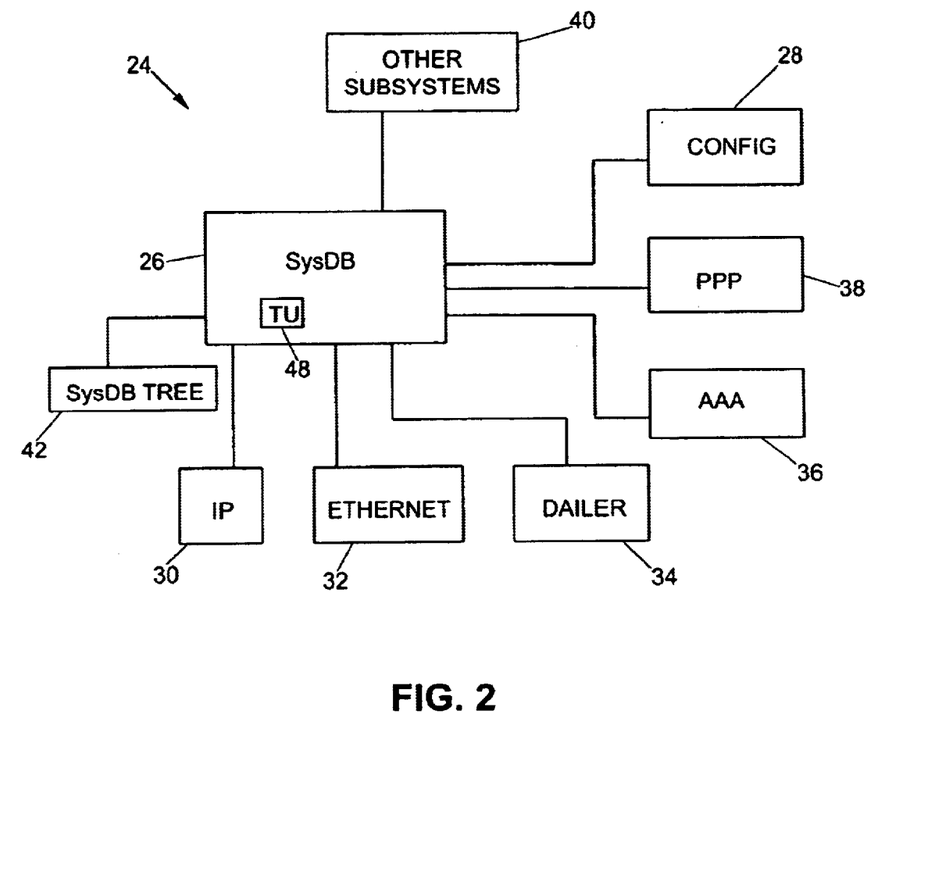
FIG. 2 is a block diagram of an internetwork operating system in accordance with the present invention.
Figure 3:
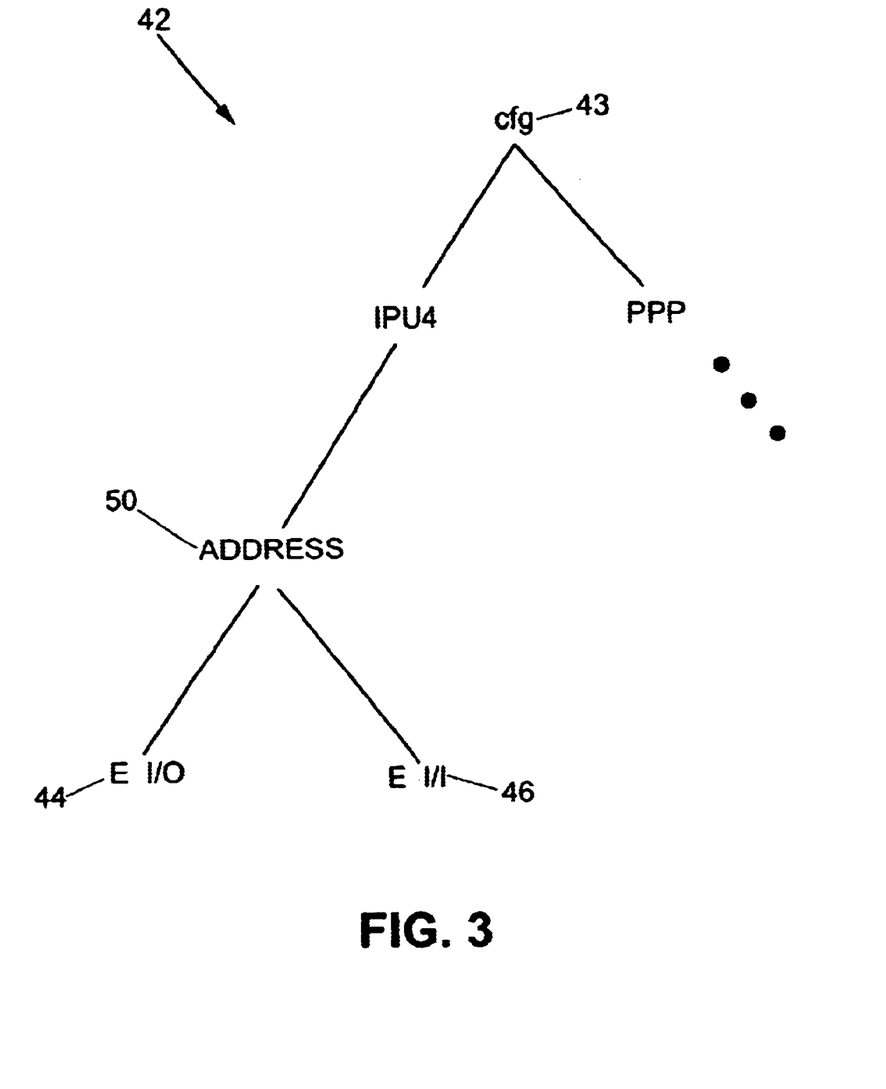
FIG. 3 is a block diagram of an exemplary tree structure for data storage suitable of use with the present invention.

Referring more specifically to the drawings, for illustrative purposes the present invention is embodied in the apparatus shown FIG. 1 through FIG. 3 and the method outlined in FIG. 4 through FIG. 7. It will be appreciated that the apparatus may vary as to configuration and as to details of the parts, and that the method may vary as to details and the order of the steps, without departing from the basic concepts as disclosed herein. The invention is disclosed generally in terms of a method and system for carrying out router configuration transactions, although numerous other uses for the invention will suggest themselves to persons of ordinary skill in the art.

Referring first to FIG. 1, there is shown generally a block diagram of a router device 10 suitable for use with the present invention. The router device 10 includes circuitry or like hardware components well known by those in the art and comprises a CPU 12, random access memory (RAM) 14 operatively coupled to the CPU 12, non-volatile memory (NVRAM) 16 operatively coupled to the CPU 12, flash memory (FLASH) 18 operatively coupled to the CPU 12, read-only memory (ROM) 20 operatively coupled to the CPU 12.

The router device 10 further includes a plurality of interface facilities (INT) 22a through 22n, each of which are operatively coupled to the CPU 12. The interface facilities (INT) 22a through 22n comprise typical ports known in the art which connect to external input/output (I/O) devices. For example, INT 22a may comprise a console port, INT 22b may comprise an Ethernet port, INT 22c may comprise an auxiliary port, and INT 22d may comprise a serial port. Various other port configurations as is known in the art may be arranged without deviating from the present invention.

The CPU 12 carries out the computational tasks associated with executing and running the internetwork operating system (IOS) software of the present invention and comprises circuitry or other hardware as is known in the art. In one exemplary embodiment, the CPU 12 comprises a MIPS R4000 CPU.

The RAM 14 may comprise random access memory or dynamic random access memory. The RAM 14 provides the main storage component for the router 10. The RAM 14 is also referred to as working storage and contains the running configuration information of the router which is managed by the system database (sysDB) as described in further detail below. RAM 14 is volatile memory as is lost when power is interrupted to the router 10.

The NVRAM 16 normally contains a persistent copy of the configuration information of the router. The configuration information includes, among other things, statements about router-specific attributes, protocol functions, and interface addresses. If power is interrupted to the router 10, the persistent copy of the configuration is provided to the router to provide normal routing operation without the need for reprogramming or reconfiguring.

The FLASH 18 is an erasable, programmable read-only memory which contains the internetwork operating system (IOS) software of the router 10. As is known in the art, flash memory has a structure that enables the flash to store multiple copies of the IOS software. Flash memory content is retained when power is interrupted from the router or the router is restarted.

The ROM 20 contains an initializing bootstrap program and is used during initial start up of the router 10. The ROM 20 usually carries out a power-on self-test (POST) to check the hardware components of the router 10 as is known in the art.

In operation, during start up, the router 10 conducts the POST check routine which is provided by the ROM 20. The POST check includes a diagnostic which verifies the basic operation of the CPU 12, the RAM 14, the NVRAM 16, the FLASH 18, and interface circuitry 22a through 22n. At the conclusion of the POST, the router 10 loads the IOS software from the FLASH 18 into the RAM 14. It will be appreciated that IOS software may be loaded using a variety of methods without deviating from the present invention including, for example, loading the IOS from an external source such as a TFTP server. The router configuration information is then loaded into RAM 14 from the NVRAM 16. More particularly, the configuration information is loaded into the database server in RAM 14. The configuration information for the router may also be loaded into RAM 14 using other means known in the art. The CPU 12 then proceeds to carry out the tasks required by the IOS.

Referring next to FIG. 2, there is shown a block diagram of an internetwork operating system (IOS) 24 in accordance with the present invention. The IOS 24 which is stored in the FLASH 18 provides the software functions and routines executed by the CPU 12 for the router device 10. The method of the present invention is preferably incorporated into the IOS software device and is executed by the CPU 12. FIG. 3 depicts a block diagram of an exemplary tree structure 42 for data storage which is used in conjunction with the IOS 24 as described herein.

The IOS 24 comprises a plurality of subsystem applications which are executed by the CPU 12 and are loaded and resident in RAM 14. The OS 24 includes a system database (sysDB) 26 subsystem, a config subsystem 28 coupled to the sysDB 26, an Internet Protocol (IP) subsystem 30 coupled to the sysDB 26, an Ethernet subsystem 32 coupled to the sysDB 26, a dialer subsystem 34 coupled to the sysDB 26, an authentication (AAA) subsystem 36 coupled to the sysDB 26, and a point-to-point protocol (PPP) subsystem 38 coupled to the sysDB 26. It will be appreciated that the configuration shown for IOS 24 is only exemplary and various arrangements of subsystems as known in the art may be used with the method of the present invention. Thus, other subsystems 40 may be coupled to the sysDB 26 to provide additional functions. For example, a SONET subsystem may be coupled to the sysDB 26 to provide optical services.

The sysDB 26 manages a centralized database coupled therewith which is shown and generally designated as sysDB tree 42. The centralized database (sysDB tree 42) may comprise any data storage structure known in the art, and is preferably structured and configured as a tree format (FIG. 3). The sysDB tree 42 contains the running router configuration information used by the various subsystems to carry out their respective tasks.

The sysDB tree structure includes a plurality of branches and leaves which stem from the root configuration (cfg) 43, wherein each branch or leaf is treated as a node or "tuple". For example, FIG. 3 shows a portion of a sysDB tree 42 which includes seven (7) tuples for accommodating router configuration data. For example, Ethernet (E) 1/0 tuple 44 contains Internet address information for Ethernet Port 0 (not shown), and Ethernet (E) 1/1 tuple 46 contains Internet address information for Ethernet Port 1 (not shown). Each tuple includes a first "current" field for storing a current or "default" value associated with configuration information related to the tuple and a second "old" field for storing an "old" configuration value for the tuple. As described further below, the "old" field at a tuple will contain a value when a transaction is currently active on that tuple. When the "old" field value is empty or NULL at a tuple, a transaction is not associated with that tuple. In certain cases, a plurality of values may be stored at a given tuple by providing an array of fields wherein each field of the array may accommodate a certain value. Other data structures for storing data at a tuple may also be implemented at a tuple without deviating from the present invention. For example, a tuple may include a pointer that points to an external data store which contains the value for the tuple.

In the preferred embodiment, each node or tuple in the sysDB tree has a pointer to its parent node, a pointer to its next peer, and a pointer to its first child. Thus, E 1/0 tuple 44 has a pointer to Address tuple 50 and to E 1/1 tuple 46. With this arrangement, all the children of a tuple can be iterated by using the first child as the head of a link list and traversing through the corresponding peer of each child.

The sysDB 26 further includes an iterating function for navigating to a particular tuple within the sysDB tree 42. A tuple iterator is created for traversing the sysDB tree 42 and is destroyed after completion of its traversal operation. Preferably a tuple iterator does not lock any of the tuples over which it traverses. The sysDB 26 further includes a transaction unit (TU) 48 for carrying out transactional tasks which are described in more detail in conjunction with FIG. 4 through FIG. 7.

The config subsystem 28 carries out the operation of receiving configuration commands for a user of the router, executing the configuration command received from the user and providing configuration information to the user of the router upon request from the user. Configuration commands normally take on several forms including displaying current configuration, changing the current configuration information for the router, and reverting the changes made to the configuration information or committing the changes made to the configuration. As described above, this router configuration information is stored and managed by the sysDB 26 in the sysDB tree 42. The method for carrying out router configurations is described in further detail below in conjunction with FIG. 4 through FIG. 7.

The IP subsystem 30 carries out the operation of providing wide-area connectivity using a set of protocols associated with Internet Protocol (IP). As is known in the art, the IP subsystem provides packet filtering and forwarding functions for the IP protocol.

A connector device (not shown) may be provided as one of the interface facilities 22a through 22n to connect Ethernet facilities to the router 10. The Ethernet subsystem 32 carries out the operation of providing packet filtering based on Ethernet MAC (Layer 2) or IP (Layer 3) addresses as is known in the art and packet forwarding as is known in the art.

The dialer subsystem 34 carries out the operation of providing dial-in connection services to a user of the router. To this end, the dialer subsystem initiates terminal reception of a user's access credentials, normally in the form of a name and a password.

The AAA subsystem 36 carries out the operation of authenticating the access credentials of users of the router.

The AAA subsystem 36 verifies the name and password of the user, which is obtained from the dialer subsystem 34 and determines configuration data for the user as well as access privileges. Configuration data may include such information as the user's IP address, for example. The configuration data for the user is stored in the sysDB tree 42 by sysDB 26 via a transaction request from the AAA subsystem 36. The operation of carrying out configuration changes is described further below in conjunction with FIG. 5.

The PPP subsystem 38 carries out the operation of providing Point-to-Point protocol services over a point-to-point link. As an aspect of providing Point-to-Point protocol services, the PPP subsystem 38 provides a method for encapsulating multi-protocol datagrams into an encapsulated protocol, provides a Link Control Protocol (LCP) which establishes, configures and test the point-to-point link, and provides a Network Control Protocol (NCP) using the encapsulated protocol, which is normally IP.

Figure 4:
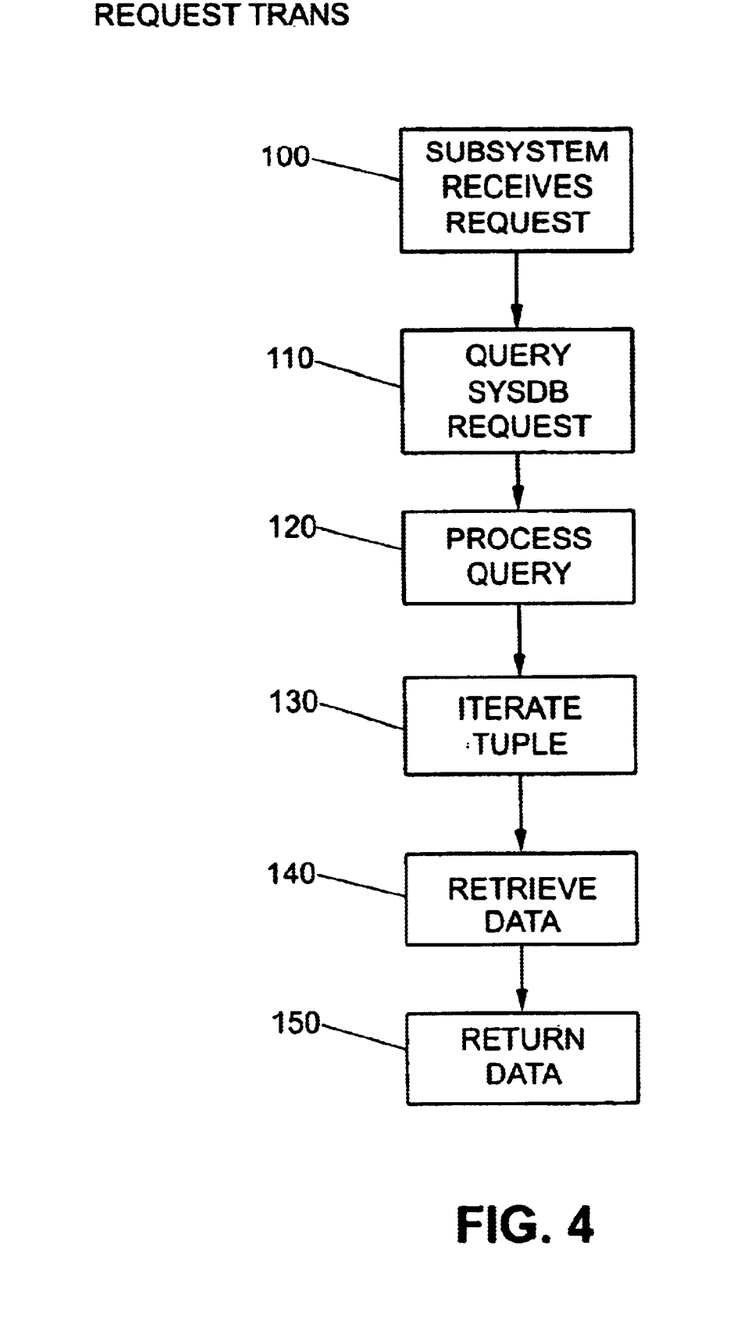
FIG. 4 is a flow chart showing generally the steps involved in a request transaction in accordance with the present invention.
Figure 5:
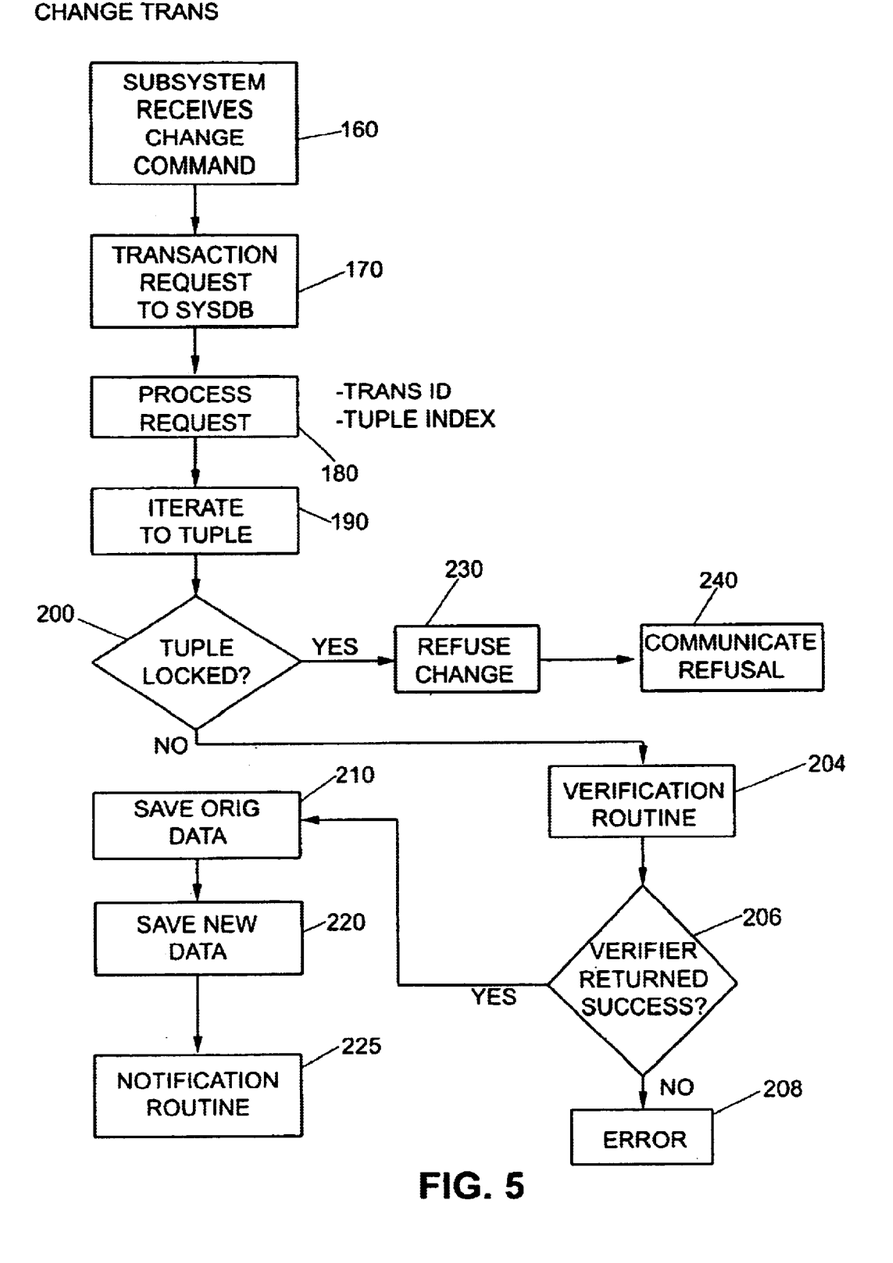
FIG. 5 is a flow chart showing generally the steps involved in a modification transaction in accordance with the present invention.
Figure 6:
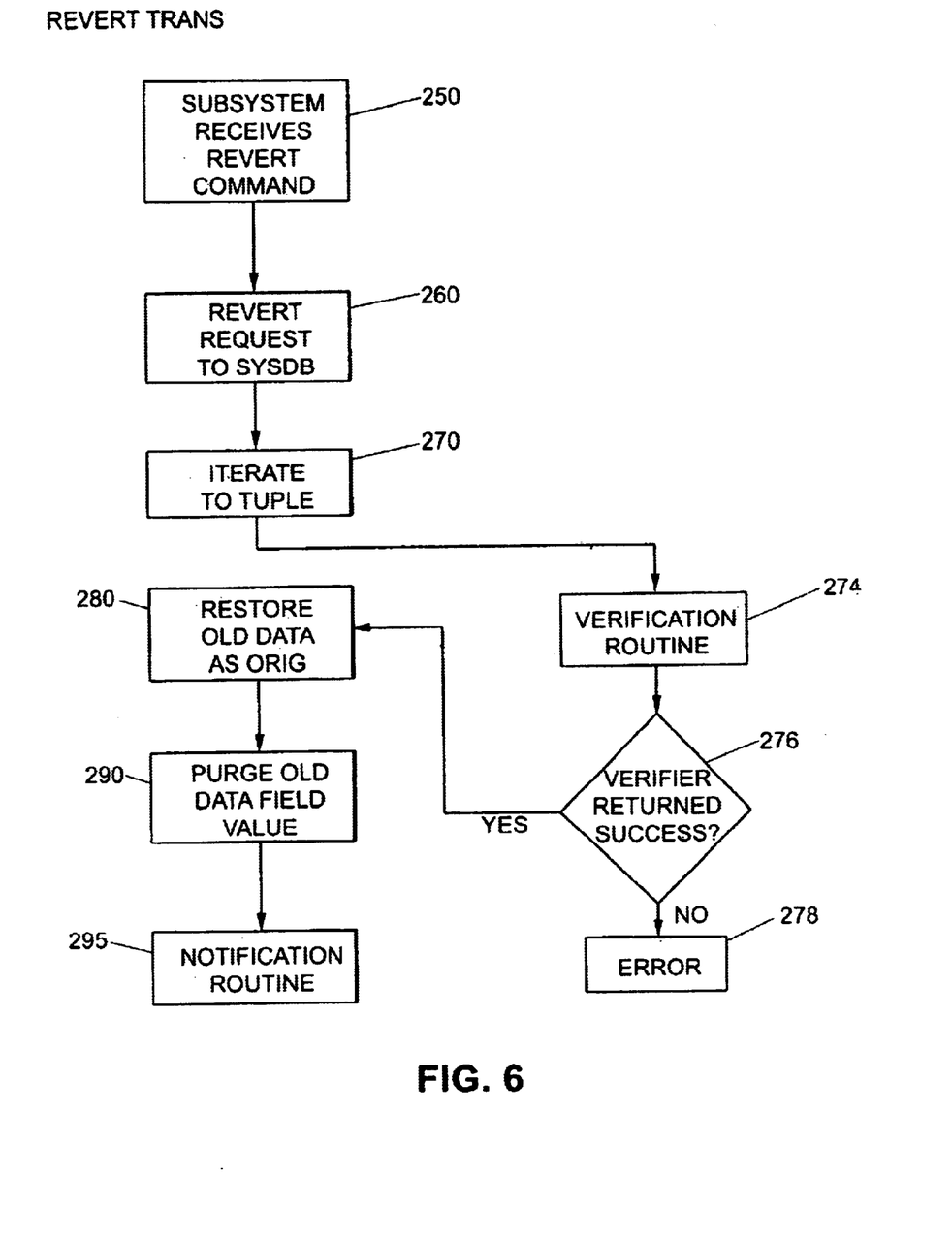
FIG. 6 is a flow chart showing generally the steps involved in a revert transaction in accordance with the present invention.
Figure 7:
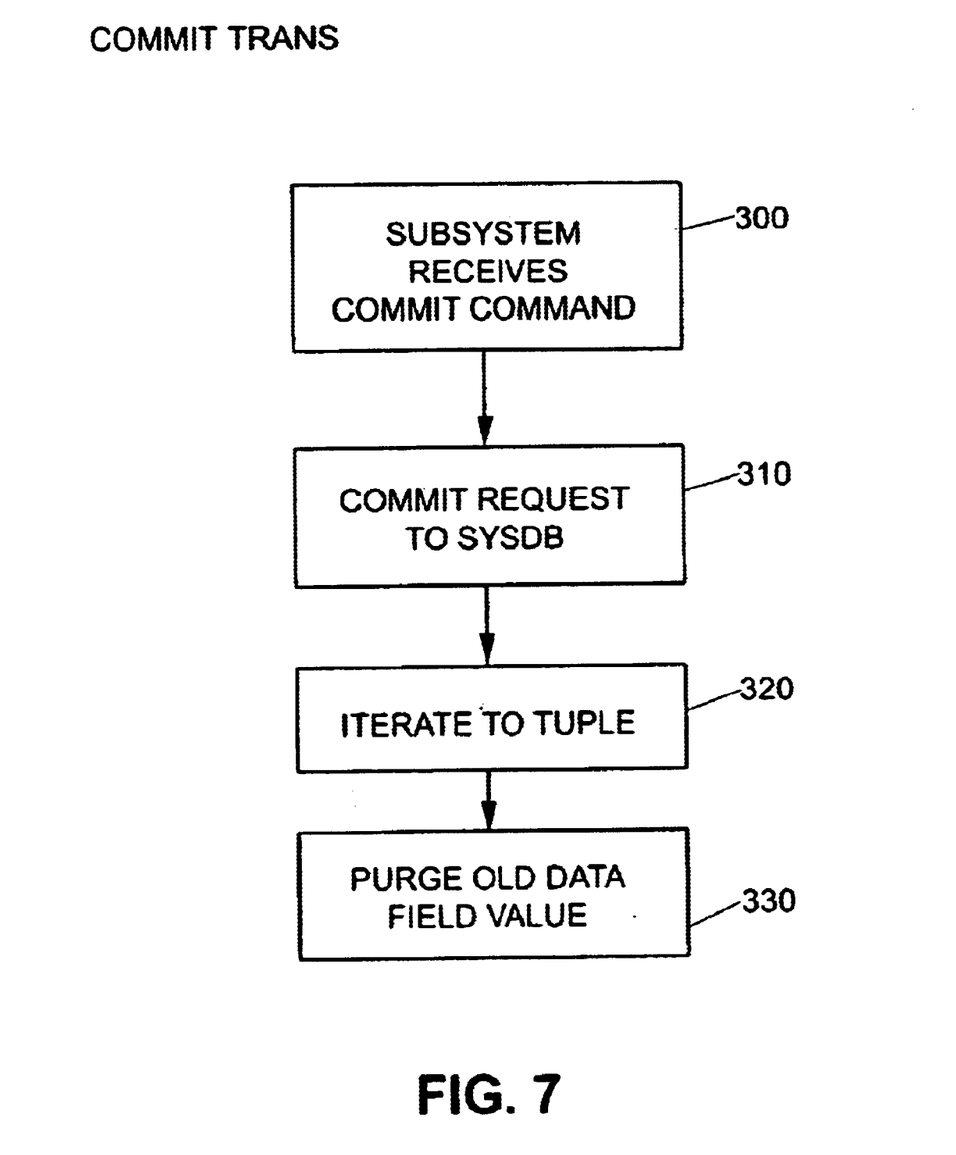
FIG. 7 is a flow chart showing generally the steps involved in a commit transaction in accordance with the present invention.

The method and operation of invention will be more fully understood with reference to the flow charts of FIG. 4 through FIG. 7, as well as FIG. 1 through FIG. 3. FIG. 4 is a flow chart showing generally the steps involved in a request transaction in accordance with the present invention. FIG. 5 is a flow chart showing generally the steps involved in a modification transaction in accordance with the present invention. FIG. 6 is a flow chart showing generally the steps involved in a revert transaction in accordance with the present invention. FIG. 7 is a flow chart showing generally the steps involved in a commit transaction in accordance with the present invention. The order of steps as shown in FIG. 4 through FIG. 7 and described below are only exemplary, and should not be considered limiting.

Referring now to FIG. 4, as well as FIG. 1 through FIG. 3, there is shown generally the method for requesting configuration data from the central database sysDB 26. Various subsystem applications 28 through 40 may require configuration data for carrying out a task. For example, IP subsystem 30 may need IP address information for carrying out routing tasks between the interface facilities 22a through 22n of the router. In some cases a subsystem may store a local copy of the configuration data locally within the subsystem and periodically check the sysDB 26 for current information. Copending application Ser. No. 09/416,308 entitled SUBSYSTEM APPLICATION NOTIFICATION METHOD IN A CENTRALIZED ROUTER DATABASE, filed Oct. 12, 1999, describes a notification method which may be used in conjunction with the present invention wherein the sysDB 26 notifies subsystems when certain configuration data has changed in the sysDB tree 42.

At step 100, a subsystem 28 through 40 receives a request for certain router configuration information. This request may originate from a manual request from a user of the router 10 or automatically as part of an event driven request. For example, a user may request a listing of the current router configuration by issuing a "show config" command via a telnet connection to the router 10. In this case, the config subsystem 28 receives the user's command instruction. Step 110 is then carried out.

At step 110, the subsystem of step 100, in response to the request received in step 100, issues a query request to the sysDB 26 for the requested information. Step 120 is then carried out.

At step 120, the sysDB 26 receives the request of step 100 and processes the request. The sysDB 26 determines, among other things, the tuple node in the sysDB tree 42 which contains the configuration data requested. The tuple is normally identified by a name stored in an index maintained by the sysDB. Step 130 is then carried out.

At step 130, the sysDB 26 calls the iterator function to navigate the sysDB tree 42. The iterator function creates an iterator which traverses the sysDB tree 42 starting from the root cfg 43. The iterator uses the pointers provided at each tuple to ascertain the location of tuple identified by the name determined in step 120. Once a pointer to the requested tuple is obtained, the iterator is destroyed. Step 140 is then carried out.

At step 140, the sysDB 26 retrieves the configuration value stored in the current or "default" field for the tuple. As noted above, each tuple includes a first "current" field for the current or default value for the tuple and a second "old" field for housing an old value for the tuple. The "old" field is nonempty when a transaction is currently open for the tuple under consideration. When a request for configuration data is requested, the value in the "current" field is retrieved. Step 150 is then carried out.

At step 150, the value retrieved in step 140 is returned to the requesting subsystem of step 110. After receiving the requested configuration data, the subsystem then carries out further processing tasks.

Referring now to FIG. 5, there is shown generally the method for changing router configuration data on the centralized database sysDB 26. Like request transactions as described above for FIG. 4, change request transactions may originate manually from a user-issued command or automatically upon the occurrence of certain events. In a change request transaction, a router configuration value within a tuple of the sysDB tree is temporarily modified. Each change made to the sysDB tree is tracked using a transaction ID. Furthermore, several changes may be grouped together into a transaction group, wherein each transaction group is a collection of transaction ID's. As described in conjunction with FIG. 6 below, changes made to the sysDB tree may be reverted. However, the step of reverting the sysDB tree is available only if the changes have not been committing as described below in conjunction with FIG. 7.

At step 160, a subsystem 28 through 40 receives a request to change configuration data. A change request may originate from a user of the router 10. For example, a user may be modifying the IP addresses of the Ethernet port facilities of the router 10. Typically, such a user would access a computer (not shown) which is operatively coupled to the router 10 and issue commands via a telnet application. In this case, the config subsystem 28 carries out the operation of receiving user-issued commands from the telnet application. A change request may also originate internally from one of the subsystem applications 30 through 40 upon the occurrence of certain events. For example, when a user accesses the router via a dial-in connection, the AAA subsystem 36 authenticates the dial-in user's access credentials provided by the dialer subsystem 34 and defines the user's router configurations such as the user's IP address and the user's access privileges, among other things. In this case, the AAA subsystem 36 carries out the operation of receiving configuration requests to authenticate a user from the dialer subsystem 34. Step 170 is then carried out.

At step 170, the subsystem receiving the configuration request in step 160 issues a change request transaction to the sysDB 26. The subsystem communicates which tuple is to be changed as well as the new value for the tuple. Step 180 is then carried out.

At step 180, the sysDB 26 receives the change request of step 170 and processes the request. The sysDB 26, among other things, defines a transaction ID associated with the present change request. The sysDB 26 also determines which tuple in the sysDB tree 42 is affected by the present change request. As described above, the tuple is identified by a name. Step 190 is then carried out.

At step 190, the sysDB 26 calls the iterator function to navigate the sysDB tree 42. The iterator function creates an iterator which traverses the sysDB tree 42 starting from the root cfg 43. The iterator uses the pointers provided at each tuple to ascertain the location of tuple identified by the name determined in step 180. Once a pointer to the requested tuple is obtained, the iterator is destroyed. Step 200 is then carried out.

At step 200, the sysDB 26 determines whether the tuple currently under consideration is already locked by another transaction. In carrying out this determination, the sysDB 26 inspects the tuple under consideration to ascertain whether the "old" field for the tuple is non-empty. As noted above, a non-empty "old" field for a tuple indicates that a transaction is currently open for the current tuple, and the tuple is locked. In a locked situation, a change request cannot be made and steps 230 and 240 are carried out. If, however, "old" field for the current tuple is empty or otherwise NULL, step 204 is carried out.

At step 204, a verification sequence is carried out. The sysDB 26 calls a verification handler routine which either authorizes the change request or denies the change request. The verification handle routine is described further in copending application Ser. No. 09/416,312 entitled METHOD AND SYSTEM FOR VERIFYING CONFIGURATION TRANSACTIONS MANAGED BY A CENTRALIZED DATABASE filed on Oct. 12, 1999. Step 206 is then carried out.

At step 206, the sysDB 26 receives a reply from the verification handler routine. The verification handler will return a "success" reply for authorized changes, or an "error" reply for unauthorized changes. If a "success" reply is issued, step 210 is carried out to set the tuple value. Otherwise step 208 is carried out to generate an error message.

At step 208, the verification handler returned an "error" in response to proposed changes issued at step 160. An error message is generated and is displayed to the user.

At step 210, the sysDB 26 preserves the original configuration value contained in the tuple as stored in the current field for the tuple. The sysDB 26 stores the value form the first current field for the tuple into the second "old" field from tuple. This step also locks the current tuple by storing data in the "old" field for the tuple thereby rendering the field non-empty. Step 220 is then carried out.

At step 220, the sysDB 26 stores the new for value for the tuple into the "current" field for the tuple. The sysDB 26 may also communicate the transaction ID associated with the present change to requesting subsystem application of step 170. This configuration change is dynamic, and the router 10 begins using this new value immediately for its routing tasks. The sysDB 26 maintains the transaction ID associated with the present change request until the change is reverted or committed as described below. Step 225 is then carried out.

At step 225, the sysDB 26 executes the notification routine which notifies registered subsystems of changes made to the requested tuple. Copending application Ser. No. 09/416,308 entitled SUBSYSTEM APPLICATION NOTIFICATION METHOD IN A CENTRALIZED ROUTER DATABASE, filed Oct. 12, 1999 describes in further detail the method for carrying out router configuration change notifications in conjunction with a centralized database and is expressly incorporated by reference herein.

At step 230, the sysDB 26 determines that the tuple under current consideration is already locked by another transaction. The proposed changes are thus refused. Step 240 is then carried out.

At step 240, the sysDB 26 communicates to the requesting subsystem that the change request has been refused because the tuple is currently locked by another transaction.

Referring next to FIG. 6, there is shown generally the method for reverting a previous change transaction request carried out by the sysDB 26. Router configuration changes may occur upon the manual command of a user or automatically upon the occurrence of a predefined event.

At step 250, a subsystem application 28 through 40 receives a request to revert a configuration change. Such request may be issued by a user of the router via telnet in which case the config subsystem 28 receives the revert command. The request may also originate from the occurrence of a certain event. The most common event that may trigger a request to revert a prior change in the router configuration is the disconnection of a user from the router. For example, a dial-in user accessing the router via a PPP connection may be disconnected by a variety of reasons ranging from a bad connection to intentional disconnection. In this case, the PPP subsystem 38 which provides point-to-point services to the dial-up user carries out the operation of sensing this disconnection event and triggering a configuration revert sequence.

In another illustrative situation, a user of router may be manually configuring various configuration components of the router such as Ethernet port data, for example, via a remote telnet connection. Where a user sets a configuration change which causes the user to be disconnected, it is desirable to revert those changes so that the user can reestablish a connection to the router. In this case, the config subsystem 28 carries out the operation of sensing this disconnection event and triggering a configuration revert sequence. Other events may also be appropriate for triggering the revert sequence described herein. Step 260 is then carried out.

At step 260, the subsystem transmits a revert request to the sysDB 26. The subsystem may also indicate which transaction ID to revert. Step 270 is then carried out.

At step 270, the sysDB 26 receives the request of step 260. From the transaction ID provided by the subsystem of step 260, the sysDB 26 determines which tuple node in the sysDB tree 42 is under present consideration. The sysDB 26 then calls the iterator function to navigate the sysDB tree 42. The iterator function creates an iterator which traverses the sysDB tree 42 starting from the root cfg 43. The iterator uses the pointers provided at each tuple to ascertain the location of tuple identified earlier in this step. Once a pointer to the tuple under consideration is obtained, the iterator is destroyed. Step 274 is then carried out.

At step 274, a verification sequence is carried out. The sysDB 26 calls a verification handler routine which either authorizes the revert request or denies the revert request. The verification handle routine is described further in copending application Ser. No. 09/416,312 entitled METHOD AND SYSTEM FOR VERIFYING CONFIGURATION TRANSACTIONS MANAGED BY A CENTRALIZED DATABASE filed on Oct. 12, 1999. Step 276 is then carried out.

At step 276, the sysDB 26 receives a reply from the verification handler routine. The verification handler will return a "success" reply for authorized reversions, or an "error" reply for unauthorized reversions. If a "success" reply is issued, step 280 is carried out to restore the original value. Otherwise step 278 is carried out to generate an error message.

At step 278, the verification handler returned an "error" in response to proposed revert request of step 250. An error message is generated and is displayed to the user.

At step 280, the sysDB 26 restore the original configuration data of the tuple. More particularly, the sysDB 26 inspects the "old" field value for the tuple to ascertain the original value. The sysDB 26 then stores this original value into the "current" field of the tuple thereby restoring the original configuration value and reverting the previous change. Step 290 is then carried out.

At step 290, the sysDB 26 purges or otherwise deletes the configuration value stored in the "old" field for the current tuple. This step sets the "old" field for the tuple to empty or NULL and thusly removes the lock on the tuple. Normally the transaction ID associated with the previous change is also destroyed. A confirming communication may be sent to the subsystem of step 260 to indicate the completion of the reversion request. Step 295 is then carried out.

At step 295, the sysDB 26 executes the notification routine which notifies registered subsystems of the reversion made to the requested tuple. Copending application Ser. No. 09/416,308 entitled SUBSYSTEM APPLICATION NOTIFICATION METHOD IN A CENTRALIZED ROUTER DATABASE, filed Oct. 12, 1999, describes in further detail the method for carrying out router configuration change notifications in conjunction with a centralized database which is incorporated by reference herein. After this step, the configuration data for the tuple may be changed again.

If a reversion of a transaction group is requested, each transaction ID associated with the transaction group is reverted according to the steps described above.

Referring now to FIG. 7, there is shown generally the method for committing a previous change transaction request carried out by the sysDB 26. Normally, this method is carried out by a manual command issued by a user of the router via a telnet application. However, the invention may also accommodate event-driven requests wherein a commit request is issued by a subsystem upon the occurrence of a predefined event.

At step 300, a subsystem 28 through 40 receives a commit command. For example, a user of the router 10 may issue a command via telnet to commit a configuration change made in a previous transaction. In this case, the config subsystem 28 carries out the operation of receiving such requests. Step 310 is then carried out.

At step 310, the subsystem transmits a commit request to sysDB 26. The subsystem may also indicate which transaction ID to commit. Step 320 is then carried out.

At step 320, the sysDB 26 receives the request of step 310. From the transaction ID provided by the subsystem of step 310, the sysDB 26 determines which tuple node in the sysDB tree 42 is under present consideration. The sysDB 26 then calls the iterator function to navigate the sysDB tree 42. The iterator function creates an iterator which traverses the sysDB tree 42 starting from the root cfg 43. The iterator uses the pointers provided at each tuple to ascertain the location of tuple identified earlier in this step. Once a pointer to the tuple under consideration is obtained, the iterator is destroyed. Step 330 is then carried out.

At step 330, the sysDB 26 purges or otherwise deletes the configuration value stored in the "old" field for the current tuple. This step sets the "old" field for the tuple to empty or NULL and thusly removes the lock on the tuple. The previous "original" value that was stored in the "old" field of the tuple is now purged and the previously "new" value stored in the "current" field of the tuple becomes the new "original" or default value for the tuple, thereby committing the changes. Normally the transaction ID associated with the previous change is also destroyed. A confirming communication may be sent to the subsystem of step 310 to indicate the completion of the commit request. After this step, the configuration data for the tuple may be changed again.

If a commit request for a transaction group is issued, each transaction ID associated with the transaction group is committed according to the steps described above.

Accordingly, it will be seen that this invention provides a method for carrying out router configuration transactions using a centralized database. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for maintaining a plurality of entries of configuration data for a router system in a configuration database subsystem comprising:

receiving a configuration change command from a configuration subsystem wherein said configuration change command is a request to modify data in a one of said plurality of entries stored in said configuration database subsystem with new data;

determining a tuple storing said one of said plurality of entries to change;

retrieving said tuple from said database;

storing data currently stored in a current data field of said tuple in an old data field of said tuple; and storing said new data from said configuration change command in said current data field of said tuple responsive to storing said data in said current data field of said tuple in said old data field of said tuple.

2. The method of claim 1 further comprising:

receiving a restore configuration command to restore old data to said one of said plurality of entries;

determining said tuple storing said one of said plurality of entries to be restored;

retrieving said tuple; and storing said data stored in said old data field of said tuple to said current data field of said tuple.

3. The method of claim 1 further comprising:

receiving notification an event has occurred;

determining said data in said one of said of said plurality of entries is to be restored in response to said event;

determining said tuple storing said one of said plurality of entries to be restored;

retrieving said tuple; and storing said data stored in said old data field of said tuple to said current data field of said tuple.

4. The method of claim 1 wherein said plurality of entries is stored in a tree and said step retrieving said one of said plurality of entries comprises:

determining a first leaf node storing said one of said plurality of entries from said configuration command; and iterating to said first leaf node.

5. The method of claim 1 further comprising the step of:

receiving a request from one of a plurality of router subsystems for configuration data;

determining a one of said plurality of entries in said database subsystem storing said configuration data from said request;

retrieving a tuple storing said one of said plurality of entries from said database;

reading data from said current data field in said tuple of said entry; and transmitting said read data to said requesting one of said plurality of router subsystems.

6. A product for maintaining a plurality of entries of configuration data for a router system in a configuration database subsystem comprising:

instructions for directing a processing unit in said router system to:

receive a configuration change command from a configuration subsystem wherein said configuration change command is a request to modify data in a one of said plurality of entries stored in said configuration database subsystem with new data, determine a tuple storing said one of said plurality of entries to change, retrieve said tuple from said database, store data currently stored in a current data field of said tuple in an old data field of said tuple, and store said new data from said configuration change command in said current data field responsive to storing said data in said current data field in said old data field; and a media readable by said processing unit for storing said instructions.

7. The product of claim 6 wherein said instructions further comprising:

instructions for directing said processing unit to:

receive a restore configuration command to restore old data to said one of said plurality of entries, determine said tuple storing said one of said plurality of entries to be restored, retrieve said tuple, and store said data stored in said old data field in said tuple to said current data field in said tuple.

8. The product of claim 6 wherein said instructions further comprise:

instructions for directing said processing unit to:

receive notification an event has occurred, determine said data in said one of said plurality of entries is to be restored in response to said event, determine said tuple storing said one of said plurality of entries to be restored, retrieve said tuple, and store said data stored in said old data field in said tuple to said current data field in said tuple.

9. The product of claim 6 wherein said plurality of entries are stored in a tree and said instructions for retrieving said one of said plurality of entries comprise:

instructions for directing said processing unit to:

determine a first leaf node storing said one of said plurality of entries from said configuration command, and iterate to said first leaf node.

10. The product of claim 6 wherein said instructions further comprise:

instructions for directing said processing unit to:

receive a request from one of a plurality of router subsystems for configuration data, determine a one of said plurality of entries in said database subsystem storing said configuration data from said request, retrieve a tuple storing said one of said plurality of entries from said database, read data from said current data field in said tuple, and transmit said read data to said requesting one of said plurality of router subsystems.

* * * * *